United States Patent [19]

Hottel, Jr. et al.

[11] 4,246,217

[45] Jan. 20, 1981

[54] CONDUCTIVE RUBBER ANTENNAS HAVING IMPROVED PHYSICAL AND ELECTRICAL PROPERTIES

[75] Inventors: H. Clarke Hottel, Jr., Mattapoisett, Mass.; Raymond A. Berard, Portsmouth, R.I.

[73] Assignee: Acushnet Company, New Bedford, Mass.

[21] Appl. No.: 956,057

[22] Filed: Oct. 30, 1978

Related U.S. Application Data

[63] Continuation-in-part of Ser. No. 938,229, Aug. 30, 1978, abandoned, which is a continuation of Ser. No. 747,189, Dec. 3, 1976, abandoned.

[51] Int. Cl.³ .............................................. C04B 35/00
[52] U.S. Cl. .................................... 264/105; 252/511; 264/157; 264/297; 343/715
[58] Field of Search ....................... 264/105, 157, 297; 252/511; 343/715

[56] References Cited

U.S. PATENT DOCUMENTS

| | | | |
|---|---|---|---|
| 1,092,883 | 4/1914 | Wieland | 264/297 |
| 3,573,122 | 3/1971 | Olstowski | 264/105 |
| 3,673,121 | 6/1972 | Meyer | 252/511 |
| 3,689,618 | 9/1972 | Chadwick | 264/105 X |
| 4,103,385 | 8/1978 | Porter | 264/157 |
| 4,134,120 | 1/1979 | DeLoach | 343/715 |

FOREIGN PATENT DOCUMENTS 2312864  12/1976  France .................................. 343/715

*Primary Examiner*—Thomas P. Pavelko
*Attorney, Agent, or Firm*—Eyre, Mann, Lucas & Just

[57] ABSTRACT

A radio antenna is made of conductive rubber. Uncured rubber is doped with conductive high structure carbon black in proportions greater than normally required to attain the desired volume resistivity. The doped rubber is milled at high shear until the standard deviation of volume resistivity is reduced below a predetermined value in the finished antennas. A copper-containing metallic stud is embedded in at least one end of the uncured antennas and is bonded to the rubber by vulcanization during curing of the rubber. The antenna has improved physical properties, uniformity of volume resistivity, and reduced resistivity variation with stress.

8 Claims, 5 Drawing Figures

CONDUCTIVE RUBBER ANTENNAS HAVING IMPROVED PHYSICAL AND ELECTRICAL PROPERTIES

RELATED APPLICATIONS

The present application is a continuation-in-Part of application Ser. No. 938,229 filed Aug. 30, 1978, now abandoned; which in turn was a continuation of Ser. No. 747,189 filed Dec. 3, 1976, now abandoned.

BACKGROUND OF THE INVENTION

Conductive rubber is typically made by mixing 15–75 parts sponge-like high structure carbon black, such as a product sold under the trademark XC-72 manufactured and sold by the Cabot Corporation, with 100 parts uncured rubber, and then curing the mixture. It is known that the conductive properties of the mixture degrades with mixing. The degradation is most rapid when mixing is done at high shear. This may be due to the relatively large sponge-like particles of carbon black breaking down into smaller particles and thus reducing the average length of unbroken conductive path through the rubber. It is, of course, known that the physical properties of rubber improve with mixing but, with conductive rubbers physical properties are sacrificed in favor of electrical properties.

Normal commercial practice has been to add the minimum amount of the high structure carbon black into the uncured rubber, then mix at the lowest possible shear for the minimum time to get reasonable dispersion of the carbon black through the mixture. In an attempt to improve the physical properties of the rubber, a method has been used of adding carbon black to a part of a batch, then mixing this part with the remainder of the batch at low shear, for example, in a roll mill. The resulting conductive rubber has great variability from batch to batch and from region to region within the same batch in its volume resistivity. In addition, the conductive rubber exhibits large changes in resistivity with flexure and strain and degraded physical properties.

Conductive rubbers are used in application where the unique combination of properties afforded by such materials are desired. For example, conductive rubber has been used in medical operating room wear and floor coverings to prevent the buildup of static electricity in the operating room personnel and equipment. In these applications, variability in electrical conductivity and other physical properties can be tolerated.

The normally wide variability in electrical conductivity is not acceptable in conductive rubber for antennas. In addition, the normally large and variable interface resistance between the rubber and external electrical circuits in unacceptable in antenna applications.

SUMMARY OF THE INVENTION

During mixing of the high structure carbon black with the uncured rubber it was discovered that the resistivity initially decreases rapidly to a minimum, rises very steeply for an interim period and later rises much more slowly. The prior art has attempted to obtain conductive rubber using the early steeply decreasing region of resistivity. The applicant has discovered that it is possible to add high structure carbon black with uncured rubber in proportions far exceeding the amount required to achieve the desired level of resistivity. Each batch is then mixed at high shear for a much greater time. The resistivity decreases rapidly and non-uniformly during the early period of mixing, passes through a minimum then rises steeply. The rate of change reduces later in the process and the variability in the product is reduced. Thus, by controlling the proportion of carbon black and the mixing time so that the desired resistivity is achieved in the region of slow resistivity rise, the resistivity of the product can be accurately reduced to a target value.

The change in resistivity with mixing appears to be due to fracture of the carbon black particles. At the very beginning of mixing, distribution of the carbon black through the base rubber is so non-uniform that extremely high resistivity exists. In the first few minutes of mixing, the carbon black is distributed more and more uniformly through the mixture, thus resulting in a rapid decrease in resistivity, until a minimum value is attained. At the minimum value, the carbon black is fairly uniformly distributed throughout the mixture. Variability in resistivity from batch to batch is still high at this minimum value of resistivity.

Conductive carbon blacks are prepared in a manner that optimizes the surface to volume ratio. The specific structures that have the highest surface to volume ratio are very sensitive to fracture. Therefore, removing them from the system, by decreasing their size and therefore their effectiveness, minimizes the sensitivity of resistivity to shear and strain. Continued mixing beyond the time yielding minimum resistivity decreases the sensitivity of the volume resistivity of the conductive rubber to absolute mixing time and to flexure. Since the sensitivity of volume resistivity to mixing time is reduced, the reproduceability of the material from batch to batch is significantly improved. In addition, the breaking down of the high structure carbon black produces more uniform dispersal and causes it to function more like reinforcing black. Thus the physical properties of the finished product are improved.

The end-to-end distributed resistance of typical high-frequency atennas is on the order of from a few ohms to a few hundred ohms. The distributed resistivity, although it dissipates rf energy, also lowers the Q of the antenna. This serves the useful function of making the antenna less sensitive to detuning by nearby objects. Interface resistance between the antenna and power source, on the other hand represents a pure power loss. A mechanical rubber-to-metal contact yields very high interface resistances on the order of from 40 to several hundred ohms. According to one aspect of the present invention there is employed sulfur-cured rubber with a metal connector containing copper, preferably brass, embedded within the rubber. The copper reacts chemically with the sulfur-containing rubber during vulcanization to bond the rubber to the metal. When the rubber-to-metal bond area exceeds one-half square inch, this method of bonding yields an interface resistance on the order of 10 percent or less of the end-to-end resistance of the finished antenna. An interface resistance of 5 percent of the end-to-end antenna resistance is routinely achieved and 1 percent or less can be achieved with suitable design of the metal and rubber interface.

DETAILED DESCRIPTION OF THE PREFERRED EMBODIMENT

Figure 1:
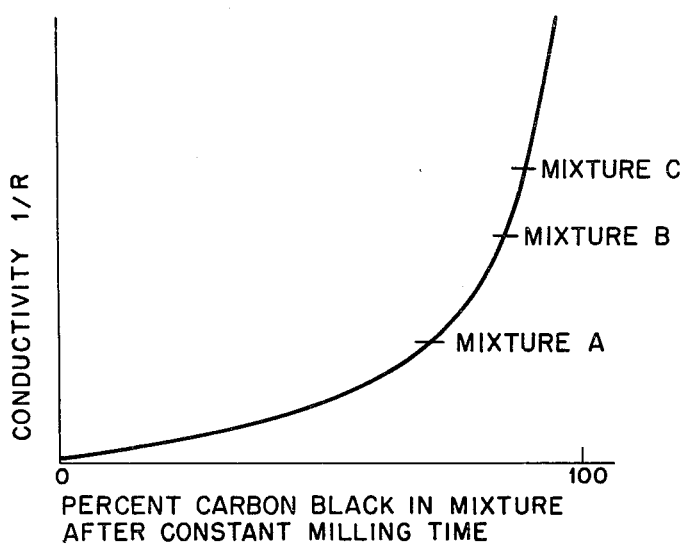
FIG. 1 shows a curve of rubber conductivity versus percent carbon black.

The illustrative curve in FIG. 1 shows how the conductivity of the rubber product varies with the percentage of high structure carbon black in the mixture, assuming that milling time is a constant. As the percentage of carbon black changes from zero to near 100%, the conductivity changes non-linearly from zero to a very high value.

Figure 2:
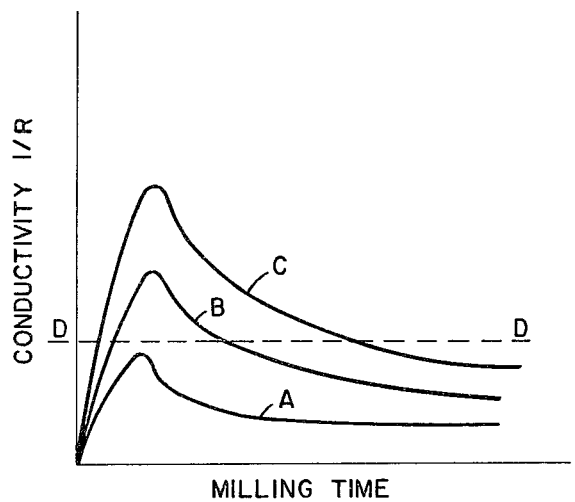
FIG. 2 shows a family of curves of conductivity versus milling time.

FIG. 2 shows three illustrative curves of conductivity versus milling time. The three curves have different percentages of high structure black, for example, mixtures A, B, and C in FIG. 1 are shown on FIG. 2 with approximately zero conductivities at the start of milling rising rapidly to a maximum, and then declining with increased mixing time.

A desired level of conductivity such as shown in the dashed line D—D in FIG. 2 can be attained in infinitely many ways by varying the mixture and milling time. For example, using mixture B, conductivity D—D is attained almost immediately on the steeply rising initial curve or later on the shallower declining curve. In the steeply rising initial curve, adequate dispersion of the carbon black is not attained and the physical properties are degraded. Note also that the slope of the declining conductivity curve past the peak for mixture A is still quite steep as it crosses the target conductivity D—D. It is thus very difficult to control the process closely enough to get the desired level of conductivity.

The mixture C requires a long milling time after the peak to reach the target conductivity D—D. The slope of the conductivity curve intersects D—D at a very shallow angle. It is thus very easy with mixture C to accurately control the milling time to achieve the target conductivity. As the milling proceeds for longer times, the physical properties of the rubber product improves.

The desired mixture is one that gives adequate control of conductivity and yields adequate physical properties. A very high percentage of carbon black as in mixture C, may require so much mixing time that production throughput is insufficient. In addition, high structure carbon black is an expensive material. Excessive percentages of it increase the materials cost of the product.

Volume resistivities are calculated from the formula:

$$R_v = RA/L \text{ ohm-cm}$$

Where:
R = resistance in ohms between two points on the material;
A = cross sectional area $CM^2$;
L = distance between the same two points in centimeters.

It is possible, with very high percentages of carbon black, to achieve volume resistivities of a fraction of an ohm-cm. One range of volume resistivities which is preferred for radio antennas, is 4 to 6 ohm-cm.

To achieve resistivities in the range of 4 to 6 ohm-cm, 35 to 200 parts by weight of high structure carbon black per 100 parts by weight of base rubber milled until the desired resistivity is attained may be used, but 75 to 125 parts of high structure carbon black per 100 parts base rubber is preferred to achieve commercially desirable production rate, 20% resistivity tolerance, acceptable physical properties, limited variations of electrical properties under stress and strain, and reasonable raw material costs.

For looser electrical tolerances, less high structure black and shorter milling time may be used. Also, if higher product volume resistivities are desired, lower quantities of carbon black can be added to the base rubber.

EXAMPLE 1

An example of the invention is described for an application requiring an accurately reproduceable volume resistivity of about 425 ohm-cm. A mixture of 25 parts of Cabot Corp. XC-72 high structure carbon black added to 100 parts of EPDM rubber, including necessary curatives, was mixed for ten minutes in a Brabender Plasticorder using the roller blade set for a clearance of 0.045 inch at 50 RPM. The resultant material exhibited a mean volume resistivity of 428 ohm-cm with a standard deviation of 35 ohm-cm, based on 10 individual samples.

EXAMPLE 2

Five samples each of the mixture of Example 1 were mixed under the conditions of Example 1, for each of 1, 2, 3, 5 and 7 minutes. The resulting mean volume resistivities and percent standard deviations are plotted in FIG. 3 for both examples.

Figure 3:
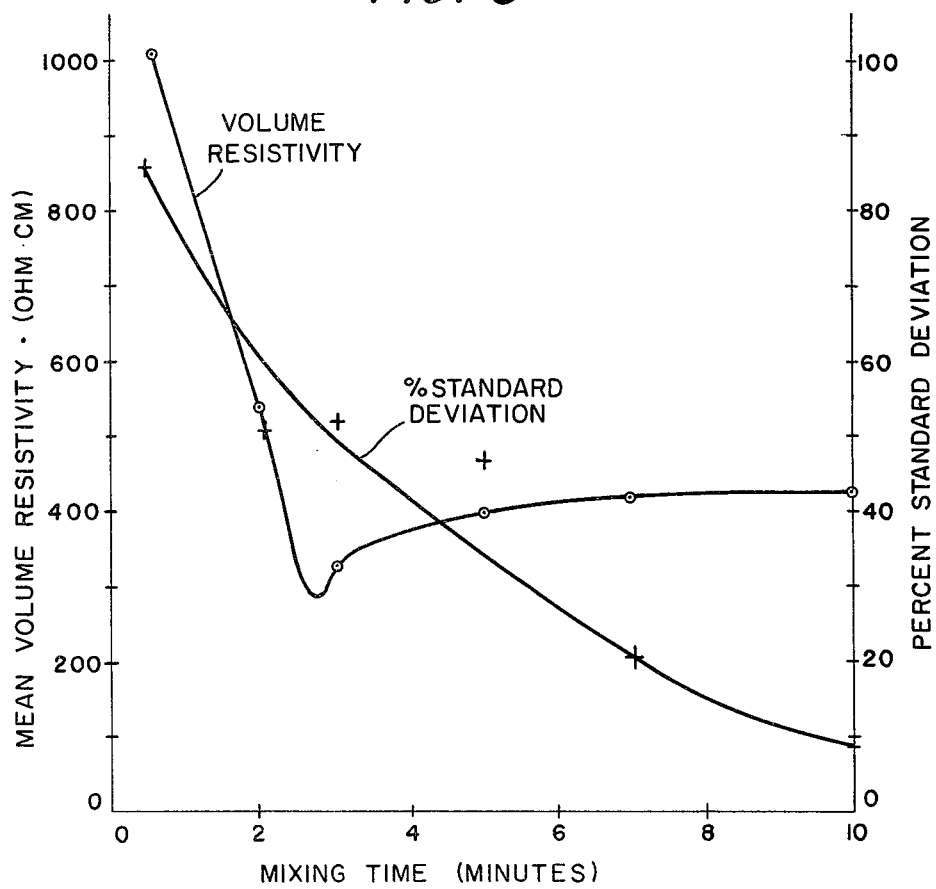
FIG. 3 shows plots of volume resistivity and standard deviation of volume resistivity versus time.

Note that the mean volume resistivities in FIG. 3 fall off rapidly in the first three minutes and then begin a rapid rise which tapers off to a slower rise. Although the applicant does not propose to be bound by a theory, the initial rapid decline in volume resistivity may result from the carbon black becoming uniformly dispersed through the mixture during this period and setting up the maximum number of particle-to-particle linkages between particles of carbon black. Breakdown of the carbon black probably also occurs in this initial period but the resistivity increase which would occur due to this phenomenon is masked by the resistivity reduction resulting from improved dispersion of the carbon black.

Beyond the minimum mean volume resistivity, a fairly rapid increase in mean volume resistivity occurs. This increase may be due to the breakdown of the larger carbon black particles with a consequent breakage of the particle-to-particle linkages. As breakdown of the larger particles continues, the remaining smaller particles are more resistant to breakdown. This results in the levelling out of the volume resistivity curve shown in FIG. 3.

The applicant has discovered that the standard deviation of volume resistivity in conductive rubber according to the present invention is functionally related to the total shear to which the mixture has been subjected as shown in FIG. 3. Total shear in a given mixing machine running at constant speed is linearly related to the mixing time. Consequently, the applicant's discovery permits one skilled in the art to relate standard deviation of volume resistivity to mixing time. This knowledge, combined with the previously described shape of the mean volume resistivity curve with time, permits one skilled in the art to define the proportions of the initial carbon black and rubber mixture and the mixing time which provides the amount of shear required to produce conductive rubber having a volume resistivity close to the target value with small variability from batch to batch.

Shear rate and total shear are terms well known in the art and are defined in the technical literature including the paper *Mixing of Rubber*, by John M. Funt (Imperial College of London, Department of Chemical Engineering). It will be clear to those skilled in the art that the actual mixing time required to attain the volume resistivities and standard deviations in Examples 1 and 2 shown in FIG. 3 will depend on the type of mixer used and the speed and setting of the moving elements. The amount of mixing achieved in the examples in ten minutes using a Brabender Plasticorder may take hours in a mixer generating lower shear such as a roll mill having low relative velocities and wide spacing. However, the shape of the volume resistivity and standard deviation curves of FIG. 3 will be substantially duplicated if mixing is continued long enough. For purposes of the present invention, satisfactory batch-to-batch reproduceability is attained when the total shear experienced by the mixture is sufficient to reduce the standard deviation of volume resistivity to 20 percent or less of the measured mean volume resistivity, measured over five separately mixed individual samples. In the examples shown in FIG. 3, this occurs just after seven minutes of mixing time.

Figure 4:
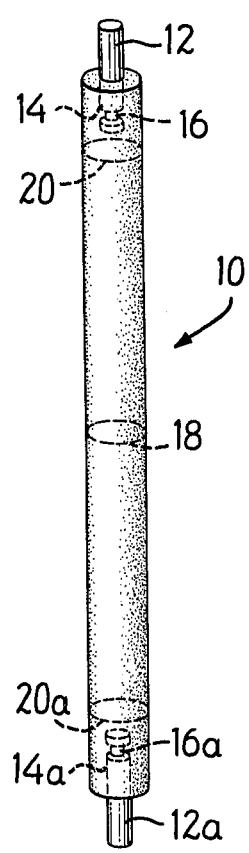
FIG. 4 shows a pair of conductive rubber antennas molded as a single unit before severing.

One of the problems with conductive rubber antennas has been accurately ascertaining their conductivities. It is difficult with known equipment to make accurate measurements because of interfacial resistance which distorts values. In accordance with another aspect of the present invention, the antennas are made with at least two embedded terminals so that accurate conductivity measurements can be made. FIG. 4 shows two antennas 10 formed as a connected pair to enable easy measurement of end-to-end resistivity. The conductive rubber in the two antennas 10 has a volume resistivity achieved as previously described. The rubber is molded about metallic connectors 12, 12a in each end of the paired two antennas before curing. The conductive rubber contains sulfur as a vulcanizing agent, and the metallic connectors 12, 12a contain copper. During curing by vulcanization, the metallic connectors 12, 12a become chemically bonded to the rubber. The metallic connectors 12, 12a may optionally have anchoring means in the embedded part 14, 14a such as the notch or groove 16, 16a shown in FIG. 4.

After manufacture, test probes, not shown, may be connected to the connectors and the connector-to-connector resistance may thereby be measured. After the measurements have been made, the article is severed at the midpoint, shown by the dashed line at 18 to yield two substantially identical items each having a connector 12, 12a in its end. If one or the other of the end connectors is not desired in the finished product, the portions containing end connectors may be cut off as at the dashed lines at 20 and 20a. Although the end-to-end resistance of the remaining conductive elastomer is not precisely the same as the measured resistance, it bears a consistent and known relationship thereto. Thus the measured connector-to-connector resistance values can be taken by inference to give a good measure of the resistance between 20 and 20a.

Figure 5:
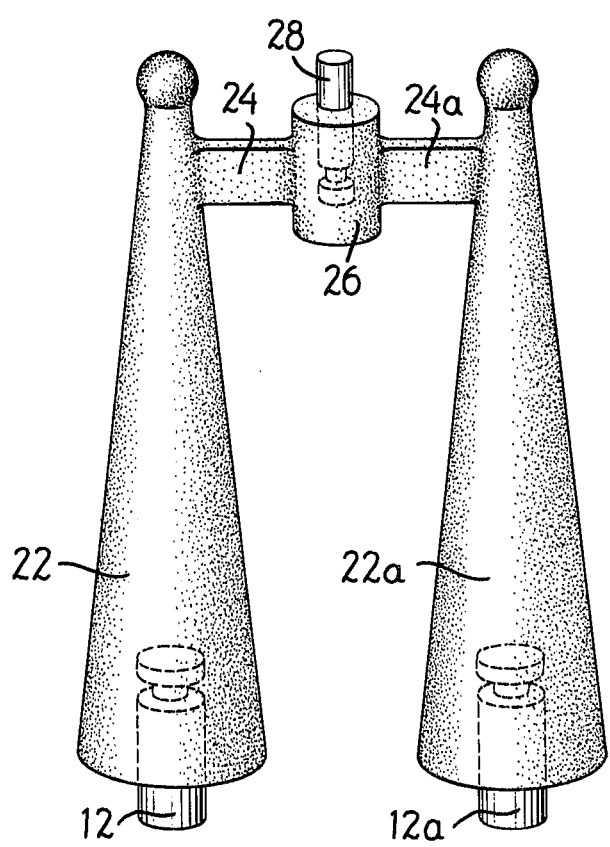
FIG. 5 shows a different form of conductive rubber antennas.

In the alternate embodiment shown in FIG. 5, a plurality of antennas 22, 22a, which may have similar or dissimilar shapes, are formed with webs 24, 24a of conductive elastomer connected to a temporary mass 26 of conductive elastomer having a temporary metallic test connector 28 embedded therein. The antennas 22, 22a contain metallic connectors 12, 12a embedded therein at a distance from the junction of the webs 24, 24a with the antennas 22, 22a. It will be observed in the figure that the webs 24, 24a do not join the antennas 22, 22a at their extremities, although it is permissible to do so, but instead join at a convenient location which may be determined on the basis of aesthetics, manufacturing economics or other criteria.

Measurements can be made between the connectors 12 and 12a analogously to the method in FIG. 4 thus giving a reading which includes the properties of both antennas 22 and 22a. In this case the test connector 28 may be omitted. Measurement of the antennas 22, 22a individually can be performed using the temporary mass 26 and the test connector 28 embedded therein. For example, resistance measurement between test connector 28 and connector 12 can be performed to test the material in antenna 22 without involving antenna 22a in any way.

After measurements are completed, the webs 24, 24a may be severed, preferably at the point they join the antennas 22, 22a. The antennas 22, 22a are thereby released from the assembly.

It will be understood that the claims are intended to cover all changes and modifications of the preferred embodiments of the invention, herein chosen for the purpose of illustration which do not constitute departures from the spirit and scope of the invention.

What is claimed is:

1. A method of making a conductive elastomer article having a stable volume resistivity despite being being subjected to stress and strain comprising:
    (a) admixing high structure carbon black with an uncured base elastomer;
    (b) milling said admixture under total sheer sufficient to achieve a standard deviation of volume resistivity of said admixture after curing of less than 20 percent of the mean volume resistivity based on a minimum of five samples said mixing time being greater than that necessary to obtain the mimimum mean volume resistivity for said mixture;
    (c) shaping the admixture to its desired form; and
    (d) curing said admixture.

2. The method of claim 1 further comprising shaping said admixture as a finished article before curing.

3. The method of claim 2 wherein said finished article is an antenna.

4. A method of making an antenna having a stable volume resistivity despite stress and strain comprising:
    (a) admixing high structure carbon black with an uncured base elastomer in proportions of from about 35 to about 200 parts by weight of high structure carbon black per 100 parts by weight of base elastomer;
    (b) milling said mixture under total shear sufficient to achieve a standard deviation of volume resistivity after curing of less than 20 percent of the mean volume resistivity based on five samples said mixing time being greater than that necessary to obtain the minimum mean volume resistivity for said mixture;
    (c) forming said admixture into the shape of an antenna; and
    (d) curing said shaped antenna.

5. The method recited in claim 4 wherein said base elastomer is rubber.

6. A method of making an antenna comprising:
(a) admixing high structure carbon black with an uncured base elastomer in proportions of from about 35 to about 200 parts by weight of high structure carbon black per 100 parts by weight of base elastomer;
(b) milling said mixture under total shear sufficient to achieve a standard deviation of volume resistivity after curing of less than 20 percent of the mean volume resistivity based on five samples said mixing time being greater than that necessary to obtain the minimum mean volume resistivity for said mixture;
(c) forming said admixture into at least two of said antennas in a connected set;
(d) said forming including embedding at least one metallic connector in each of said antenna;
(e) said forming further including embedding a test connector in a test mass of conductive elastomer which is connected to each of said antennas;
(f) curing said connected set; and
(g) severing said antennas from said test mass and each other.

7. The method recited in claim 6 further comprising the step of forming at least two of said antennas in dissimilar shapes.

8. The method recited in claim 6 further comprising the step of forming all of said antennas in substantially identical shapes.

* * * * *

UNITED STATES PATENT AND TRADEMARK OFFICE
CERTIFICATE OF CORRECTION

PATENT NO. : 4,246,217
DATED : January 20, 1981
INVENTOR(S) : H. Clarke Hottel

It is certified that error appears in the above-identified patent and that said Letters Patent are hereby corrected as shown below:

Column 6, line 33: Delete "being" (first occurrence).

Column 6, line 37: Delete "sheer", insert --shear--.

Signed and Sealed this

Twenty-eighth Day of April 1981

[SEAL]

Attest:

RENE D. TEGTMEYER

Attesting Officer     Acting Commissioner of Patents and Trademarks